United States Patent
Schramm et al.

(10) Patent No.: US 9,667,693 B2
(45) Date of Patent: May 30, 2017

(54) METHOD AND APPARATUS FOR SYNCHRONIZING DATA IN TWO PROCESSING UNITS IN A VEHICLE

(71) Applicant: Bayerische Motoren Werke Aktiengesellschaft, Munich (DE)

(72) Inventors: Andreas Schramm, Wegscheid (DE); Max Kicherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 901 days.

(21) Appl. No.: 13/677,979

(22) Filed: Nov. 15, 2012

(65) Prior Publication Data

US 2013/0070860 A1    Mar. 21, 2013

Related U.S. Application Data

(63) Continuation of application No. PCT/EP2011/057825, filed on May 16, 2011.

(30) Foreign Application Priority Data

May 17, 2010    (DE) .................. 10 2010 029 030

(51) Int. Cl.
  *H04L 29/08*    (2006.01)
  *H04J 3/06*    (2006.01)
  (Continued)

(52) U.S. Cl.
  CPC ............ *H04L 67/06* (2013.01); *H04J 3/0682* (2013.01); *H04N 21/41422* (2013.01);
  (Continued)

(58) Field of Classification Search
  CPC . H04L 67/06; H04J 3/0682; H04N 21/41422; H04N 21/4305; H04N 21/4307;
  (Continued)

(56) References Cited

U.S. PATENT DOCUMENTS 5,319,453 A * 6/1994 Copriviza .............. H04H 20/14
                                                                346/6
5,321,750 A * 6/1994 Nadan .................. H04N 7/1675
                                                              348/476

(Continued)

FOREIGN PATENT DOCUMENTS

EP    0 855 311 B1    7/1998
EP    1 259 082 A2    11/2002
  (Continued)

OTHER PUBLICATIONS

German Search Report dated Jun. 28, 2011 including partial English-language translation (Six (6) pages).
(Continued)

*Primary Examiner* — Jay Patel
*Assistant Examiner* — Joseph Suh
(74) *Attorney, Agent, or Firm* — Crowell & Moring LLP (57) ABSTRACT

The invention proposes a method for processing data in a vehicle in which the data are received by a first processing unit via a network; in which the data are decoded by the first processing unit; and in which a piece of reproduction information comprising an output time or a piece of synchronization information is transmitted to the second processing unit. In addition, an appropriate apparatus is specified.

16 Claims, 5 Drawing Sheets

(51) Int. Cl.
*H04N 21/414* (2011.01)
*H04N 21/43* (2011.01)
*H04N 21/434* (2011.01)
*H04N 21/4363* (2011.01)

(52) U.S. Cl.
CPC ..... *H04N 21/4305* (2013.01); *H04N 21/4307* (2013.01); *H04N 21/4341* (2013.01); *H04N 21/43632* (2013.01); *H04N 21/43637* (2013.01)

(58) Field of Classification Search
CPC ......... H04N 21/4341; H04N 21/43632; H04N 21/43637
See application file for complete search history.

(56) References Cited

U.S. PATENT DOCUMENTS

| | | | | |
|---|---|---|---|---|
| 5,768,539 | A * | 6/1998 | Metz | G06F 8/60 348/E5.006 |
| 5,987,418 | A * | 11/1999 | Gentit | G11B 20/00007 704/201 |
| 6,049,565 | A * | 4/2000 | Paradine | H04L 12/64 375/217 |
| 6,151,443 | A * | 11/2000 | Gable | G11B 27/032 375/E7.023 |
| 6,157,725 | A | 12/2000 | Becker | |
| 6,359,910 | B1 * | 3/2002 | Takahashi | H04N 7/52 348/423.1 |
| 6,925,250 | B1 * | 8/2005 | Oshima | H04N 5/04 348/E13.014 |
| 8,341,454 | B1 * | 12/2012 | Kondapalli | G06F 1/12 713/400 |
| 8,731,000 | B2 * | 5/2014 | Begen | H04N 21/4305 370/503 |
| 2001/0007568 | A1 * | 7/2001 | Morris | G11B 27/10 370/473 |
| 2001/0008535 | A1 | 7/2001 | Lanigan | |
| 2002/0012437 | A1 * | 1/2002 | Murata | G11B 19/02 381/98 |
| 2002/0041540 | A1 * | 4/2002 | Nagata | G11B 20/1252 369/30.07 |
| 2002/0055215 | A1 * | 5/2002 | Tamura | G06T 9/007 438/200 |
| 2003/0031258 | A1 * | 2/2003 | Wang | H04N 21/4435 375/240.24 |
| 2003/0066094 | A1 * | 4/2003 | van der Schaar | H04N 21/4302 725/151 |
| 2003/0125933 | A1 * | 7/2003 | Saunders | G09B 5/04 704/201 |
| 2003/0179319 | A1 * | 9/2003 | Demas | H04N 5/76 348/565 |
| 2004/0076397 | A1 * | 4/2004 | Kawahara | G11B 20/10 386/263 |
| 2006/0120462 | A1 * | 6/2006 | Tsuboi | H04N 21/4305 375/240.25 |
| 2006/0133774 | A1 * | 6/2006 | Toida | H04N 5/76 386/353 |
| 2006/0215768 | A1 * | 9/2006 | Kerofsky | H04N 19/176 375/240.28 |
| 2006/0216002 | A1 * | 9/2006 | Okada | G11B 20/10527 386/268 |
| 2008/0101466 | A1 * | 5/2008 | Swenson | H04N 21/2402 375/240.07 |
| 2008/0187282 | A1 * | 8/2008 | Brady | H04N 5/073 386/201 |
| 2008/0209482 | A1 * | 8/2008 | Meek | H04N 5/607 725/105 |
| 2008/0272649 | A1 * | 11/2008 | Order | B60R 16/0215 307/10.1 |
| 2009/0015659 | A1 * | 1/2009 | Choi | H04N 7/152 348/14.09 |
| 2009/0074376 | A1 * | 3/2009 | Lin | H04N 9/8211 386/239 |
| 2009/0092326 | A1 * | 4/2009 | Fukuhara | H04N 19/139 382/233 |
| 2009/0169183 | A1 * | 7/2009 | Fujinami | G11B 27/005 386/248 |
| 2010/0100923 | A1 * | 4/2010 | Toiyama | H04N 21/2365 725/131 |
| 2010/0122310 | A1 * | 5/2010 | Chozui | H04N 7/163 725/139 |
| 2010/0166053 | A1 * | 7/2010 | Fukuhara | H04N 19/46 375/240.01 |
| 2011/0044461 | A1 * | 2/2011 | Kuech | H04M 9/082 381/66 |
| 2011/0261257 | A1 * | 10/2011 | Terry | G06K 9/00221 348/515 |
| 2012/0236156 | A1 * | 9/2012 | Johnson | H04S 7/301 348/181 |

FOREIGN PATENT DOCUMENTS

| | | |
|---|---|---|
| EP | 1 643 775 B1 | 4/2006 |
| WO | WO 2004/043032 A2 | 5/2004 |

OTHER PUBLICATIONS

International Search Report dated Aug. 19, 2011 including English-language translation (Six (6) pages).

Ishibashi et al., "A group synchronization mechanism for stored media in multicast communications", Infocom '97. Sixteenth Annual Joint Conference of the IEEE Computer and Communications Societies. Driving the Information Revolution., Proceedings IEEE, Kobe, Japan, Apr. 7-11, 1997, Los Alamitos, CA, USA, IEEE Comput. Soc, US, vol. 2, Apr. 7, 1997 (Apr. 7, 1997), pp. 692-700, XP010252076, DOI: 10.1109/INFCOM.1997.644522, ISBN: 978-0-8186-7780-9.

Schöpp, "Video Transmission in Second Generation MOST Systems", http://www.mostcooperation.com, Nov. 18, 2007 (Nov. 18, 2007), pp. 1-23, XP000002656534.

* cited by examiner

METHOD AND APPARATUS FOR SYNCHRONIZING DATA IN TWO PROCESSING UNITS IN A VEHICLE

CROSS REFERENCE TO RELATED APPLICATIONS

This application is a continuation of PCT International Application No. PCT/EP2011/057825, filed May 16, 2011, which claims priority under 35 U.S.C. §119 from German Patent Application No. 10 2010 029 030.0, filed May 17, 2010, the entire disclosures of which are herein expressly incorporated by reference.

BACKGROUND AND SUMMARY OF THE INVENTION

The invention relates to a method and an apparatus for processing data in a vehicle.

An Audio Video Bridging (AVB) technology is known which permits the transport of time-synchronized audio and video data with a slight delay while utilizing a quality of service (QoS) by way of an Ethernet connection. An audio-visual data stream (A/V stream) can be identified according to the AVB by an identification (Stream ID). This identification comprises a MAC address of an AVB source.

Furthermore, a transport protocol according to IEEE 1722 is known ("AVB Transport Protocol"). In this case, an Ethernet frame comprises an IEEE P1722 data stream, a packet of the data stream comprising a presentation time (also called AVB TP time stamp). By means of the AVB technology, it can already be determined on layer-2 by an analysis of the so-called ether type whether the IEEE 1722 packet involves A/V data or other information (such as other IP data). The IEEE 1722 packet therefore does not first have to be analyzed at high cost over several layers of a protocol stack before the type of the data content can be determined. The above-mentioned presentation time is determined by the AVB source. The IEEE 1722 packet comprises payload, for example, in the form of an IEC 61883 packet. Other A/V formats can be used correspondingly.

A protocol for the time synchronization or clock synchronization of various components of a network is also known according to IEEE 802.1AS or PTP (Precision Time Control).

Vehicles increasingly have monitors (also called display units or displays) which make it possible for the passengers (the front passenger; when the vehicle is stationary, particularly also the driver, and/or passengers in the rear compartment of the vehicle) to view audio-visual contents, such as films or telecasts. For this purpose, several monitors are often arranged in the vehicle, for example, one or two monitors in the rear compartment and one or two monitors for the driver as well as the front passenger. When all passengers are viewing the same audio-visual content, the output of the audio contents can take place by way of a main sound field of the vehicle, comprising, for example, at least one amplifier with connected loudspeakers. In this case, it is important that the output of the sound takes place in a lip-synchronized manner with respect to the output of the image on all monitors. Even slight deviations from such a lip-synchronized output of the sound are found to be annoying by the users.

In this case, it is problematic that a data source (A/V source) provides a compressed audio-visual data stream which is outputted, for example, by way of a front processing unit (for example, a so-called head unit), on at least one front monitor and, by way of a rear processing unit (for example, a rear seat entertainment unit (RSE)), on at least one rear monitor of the vehicle and, in the process, the audio-visual data stream is decoded separately by the front as well as by the rear processing unit. The duration of the transmission of the data stream and of the decoding of the data stream may differ, whereby the image data outputted in the front and in the rear will drift apart, and the lip synchronicity of the reproduced images with respect to the outputted sound is not ensured. It should be noted that, when one of the processing units is used for controlling the main sound field, the other processing unit will not automatically reproduce the decoded image data on the connected monitor in a lip-synchronized manner with respect to the sound emitted by way of the main sound field.

It is an object of the invention to avoid the above-mentioned disadvantages and, in particular, create a solution for outputting a piece of audio information in a lip-synchronized manner with respect to video information, in which case, especially the video information can be decoded by different processing units of a vehicle.

This object is achieved according to the characteristics of the independent claims. Further developments of the invention are also contained in the dependent claims.

For achieving this object, a method is suggested for processing data in a vehicle,
    wherein the data are received by a first processing unit by way of a network;
    wherein the data are decoded by the first processing unit;
    wherein a piece of reproduction information comprising an output time or a piece of synchronization information is transmitted to the second processing unit.

Advantageously, the second processing unit is therefore informed of an output time by the first processing unit, specifically after the decoding of the received data in the first processing unit. For example, in this manner, the output time can be determined by the first processing unit, which output time, for example, takes into account transit times for the transmission of data in the network and/or processing times in the individual components of the network, and the second processing time is correspondingly informed. It can thereby be achieved that a synchronized output of the data takes place to several processing units or output units of the network. In particular, a lip-synchronized output of audio and video information can therefore take place (for example, to several monitors of the vehicle which are controlled at least partially by different processing units).

It should be noted here that correspondingly more than two processing units can be provided, in which case, the first processing unit can then correspondingly treat a further processing unit like the second processing unit.

The data may, for example, be combined audio and video information which is transmitted particularly in a compressed manner and is received by the first (and possibly the second) processing unit.

The piece of audio information can be outputted by way of at least one loudspeaker, and the video information can be outputted by way of at least one monitor (display unit). In particular, at least one monitor respectively can be connected to the first and/or second processing unit, on which monitor the piece of video information of the received and decoded data are outputted.

The network may be a connection structure which permits a communication between components of the network. The network is, for example, a packet-oriented network, such as an Ethernet or an IP-based network. The network may comprise wired or wireless communication sections (for example, radio links). The network may, for example, have a wireless network, such as a wireless LAN (WLAN) or at least one Bluetooth connection. The network may also comprise a bus system, such as a MOST network (also called MOST bus or MOST bus system), in which the connected components know a common time base (for example, a so-called MOST system time) and can utilize the latter correspondingly.

The processing unit may be a control device of the vehicle. The first processing unit may, for example, be a central control device of the vehicle (for example, a so-called head unit). The second processing unit may, for example, be a control device of an RSE unit. In particular, the processing unit may be a mobile device that is connected with the network, for example, by way of a radio interface. It thereby becomes possible that, for example, a monitor functionality of a mobile device is integrated as a (second) processing unit; the output of the piece of sound information may, for example, take place by way of the main sound field of the vehicle. Thus, a passenger in the vehicle can use the display of his mobile terminal for viewing the piece of video information from the source and, with respect to the latter, hears the piece of audio information by way of the vehicle loudspeakers in a lip-synchronized manner.

It should further be noted that the piece of synchronization information is a piece of information by means of which a synchronization of the second processing unit (or of a part, for example, a decoding unit) with the first processing unit (or of a part, for example, a decoding unit) can be achieved. In particular, it can thereby be ensured that the processing unit, which controls the output of the piece of sound information, also causes or controls the synchronization with the at least one remaining processing unit.

Furthermore, it is an option that the output time and the piece of synchronization information are transmitted as a piece of reproduction information to the second processing unit.

The piece of reproduction information comprises, for example, a telegram that is transmitted, for example, by means of a PTP to the second processing unit.

In particular, the processing unit may have at least one memory (also called "buffer") for temporarily storing incoming data (for example, data packets) and/or for temporarily storing decoded video and/or audio information.

It is also conceivable that the first processing unit has a transmitter for transmitting the piece of reproduction information and, as required, the decoded data to the second (and/or an additional) processing unit and/or to an output unit.

The data can be made available in the vehicle by a source. The source may, for example, comprise a transcoder, a receiver, a hard disk or a playback drive (for example, a CDROM, DVD, Blue-Ray drive). The data may comprise audio-visual contents, such as films, telecasts, or the like. In particular, the data can be provided by mobile devices, such as a computer, a mobile telephone, a personal digital assistant (PDA) or the like.

The data can be reproduced locally in the vehicle by a data carrier or can be loaded or received at least partially by way of a, for example, wireless interface (such as a DVB, WLAN, mobile interface, etc.) The source preferably provides the data as a packet-oriented data stream by way of the network. The providing can take place, for example, as a transmission to all users, to some of the users, or to an individual user of the network (broadcast, multicast, unicast).

It is a further development that the data are received by the first processing unit and by the second processing unit (particularly from the source by way of the network).

It is a further development that the data are decoded by the second processing unit,
wherein a portion of the decoded data, particularly the audio or the video information, is discarded;
wherein the not discarded decoded data are outputted at the transmitted output time, particularly by the second processing unit.

For example, the data comprising the audio and video information are decoded, the audio information is then discarded by the second processing unit because this audio information is also decoded by the first processing unit, and a main sound field of the vehicle (comprising at least one amplifier and at least one loudspeaker in the vehicle) are controlled by this first processing unit.

As an alternative, it is conceivable that the piece of video information is discarded. A portion of the piece of audio information or a portion of the piece of video information can also be discarded. In particular, portions of a piece of audio information can be decoded and outputted at different locations or processing units of the vehicle (for example, different sound channels in the case of stereo, surround or other multi-channel sound outputs).

Furthermore, it is a further development that the data have a presentation time, as of which the received data are decoded by the first processing unit and by the second processing unit.

It is also a further development that the data comprise data packets, at least one data packet containing a presentation time.

In particular, these may be data packets according to an AVB protocol or based on an AVP protocol. For example, the data can be transmitted in IEEF 1722 packets.

It is also a further development that the second processing unit has an audio-decoding unit and a video-decoding unit, the output of the video-decoding unit being controlled by way of the output time of the first processing unit.

In particular, the decoding of the video-decoding unit can be delayed by means of the transmitted output time corresponding to the second processing unit. The first processing unit therefore controls the video-decoding unit of the second processing unit by means of the transmitted output time.

Within the scope of an additional further development, the first processing unit has an audio-decoding unit and a video-decoding unit, an output of the video-decoding unit of the first processing unit being controlled, particularly delayed, by the audio-decoding unit of the first processing unit.

Here, it is an advantage that the audio-decoding unit may be implemented in software and, in the event of a (temporarily high) loading of the processing unit by other functions, this audio-decoding unit controls the video-decoding unit such that the reproduction of the piece of video information still always takes place in a lip-synchronized manner with respect to the decoded and outputted piece of audio information.

Another further development consists of the fact that the video-decoding unit of the first processing unit is controlled by means of the output time.

It is an embodiment that at least a portion of the data decoded by the first processing unit is transmitted by way of the network to an output unit.

The output unit preferably is a component that is connected with the network and can receive data by way of this network. The output unit may have an audio output unit (for example, having at least one amplifier and at least one loudspeaker) and/or a video output unit.

The decoded data provided by the first processing unit can be outputted preferably without further decoding or transcoding.

In particular, it is a further development that the portion of the decoded data transmitted to the output unit comprises audio data.

As an alternative, it is also conceivable that the decoded data are video data or comprise such data.

An alternative embodiment consists of the fact that the output unit comprises at least one amplifier with at least one loudspeaker respectively.

In particular, the output unit may have a buffer (memory) for temporarily storing the incoming decoded data.

Especially a main sound field of a vehicle can be controlled by means of the output unit.

It is a further embodiment that the decoded data are transmitted together with the output time to the output unit.

It is therefore also conceivable that the output unit outputs the decoded data at the output time. As a result, also when several distributed components are used, which are mutually connected by way of a network, a lip-synchronized output of pieces of audio- and video information can be achieved.

It is also an embodiment that the decoded data are transmitted with the output time to the output unit by means of an AVB protocol, particularly at least one IEEE 1722 packet.

The output time can correspondingly be inserted as the presentation time into the packets of the AVB protocol.

A further development consists of the fact that the components connected to the network are synchronized (with respect to the time).

It is suggested in particular that several components of the network are synchronized to a common time base, so that the output of the processed data can take place based on this common time base.

The common time base of the several components of the network can be achieved by means of a suitable protocol, such as a PTP (Precision Time Protocol, according to IEEE 1588 or IEEE 802.1AS). By means of the synchronized components of the network, it becomes possible that the presentation time is interpreted in the same fashion in different components, and therefore the output can take place in a time-synchronized manner in distributed components.

Another further development consists of the fact that the network comprises a bus system.

In particular, the bus system may be constructed as a MOST system. A synchronous and/or isochronous channel of the bus system can be used for the transmission of the piece of synchronization information.

In addition, it is a further development that, by means of the piece of synchronization information, the second processing unit is synchronized with the first processing unit.

In particular, the piece of synchronization information may be a time stamp of the video decoding unit of the first processing unit. Thus, the video-decoding units of the first processing unit and of the second processing unit can synchronize themselves, and a lip-synchronized output of the piece of audio and video information can be ensured.

The above-mentioned object is also achieved by means of an apparatus comprising a processing unit which is set up such that the method described here can be implemented.

The processing unit may, for example, be a (partially) analog or (partially) digital processing unit. It may be constructed as a processor and/or as an at least partially hard-wired circuit arrangement which is set up such that the method can be implemented as described here.

The processor may be any type of processor or computer with the correspondingly required periphery (memory, input/output interfaces, input/output devices, etc.) or comprise such a computer. Furthermore, a hard-wired circuit unit, for example, an FPGA or an ASIC or an other integrated circuit, can be provided.

It is a further embodiment that the device comprises a control device or a part of a control device of the vehicle.

The above-mentioned object is also achieved by means of a vehicle comprising at least one of the apparatuses described here.

Embodiments of the invention will be illustrated and explained in the following by means of the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
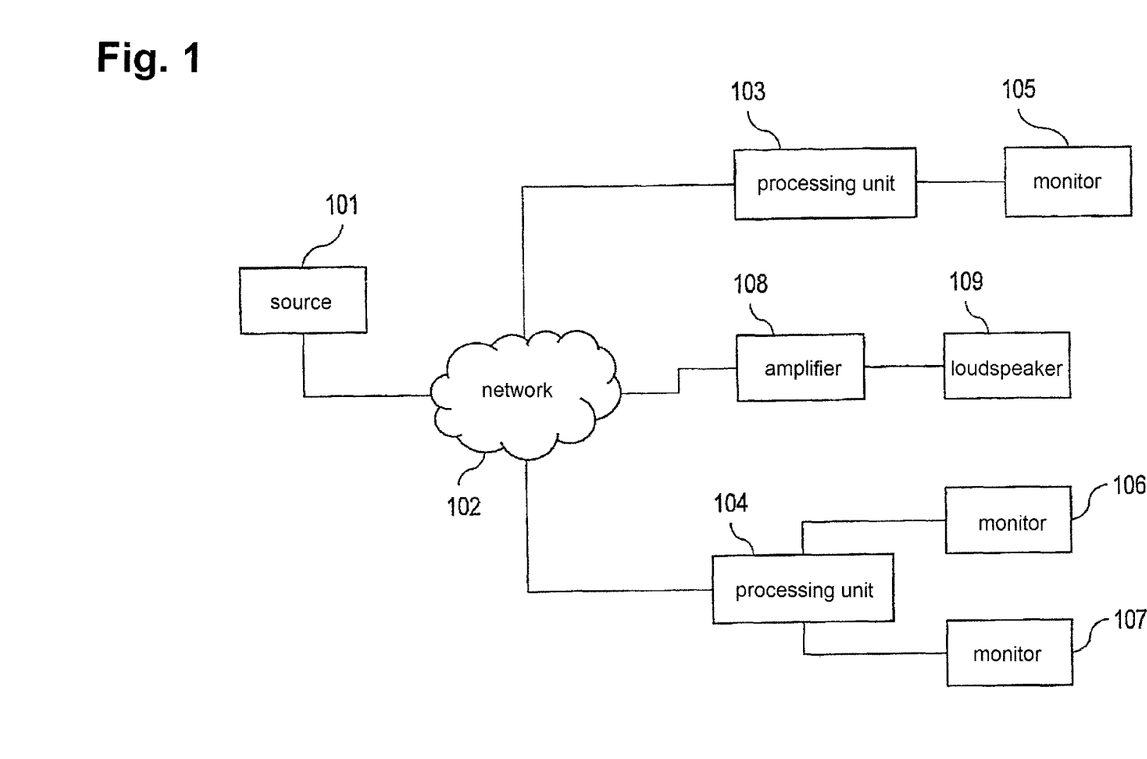
FIG. 1 illustrates an example of an arrangement of a network in a vehicle comprising a data source.

FIG. 1 illustrates an example of an arrangement of a network in a vehicle comprising a data source 101 which is connected by way of a network 102, such as an Ethernet, with a first processing unit 103 (for example, a head unit) and with a second processing unit 104 (for example, an RSE unit). One monitor 105 is connected to the processing unit 103, and two monitors 106, 107 are connected to the processing unit 104. Furthermore, an amplifier 108 is connected with the network 102, which amplifier 108 feeds (at least) one loudspeaker 109.

In the example illustrated in FIG. 1, the data source 101 routes a compressed audio-visual data stream by way of the network 102 to the processing units 103, 104, which decode the data stream and display the image data on the connected monitors 104, 107. Only the processing unit 103 decodes the piece of audio information (sound information) and transmits it by way of the network 102 to the amplifier 108. A lip-synchronized output of the piece of audio information with respect to the video information illustrated on the monitors 106, 107 correspondingly does not exist.

Figure 2:
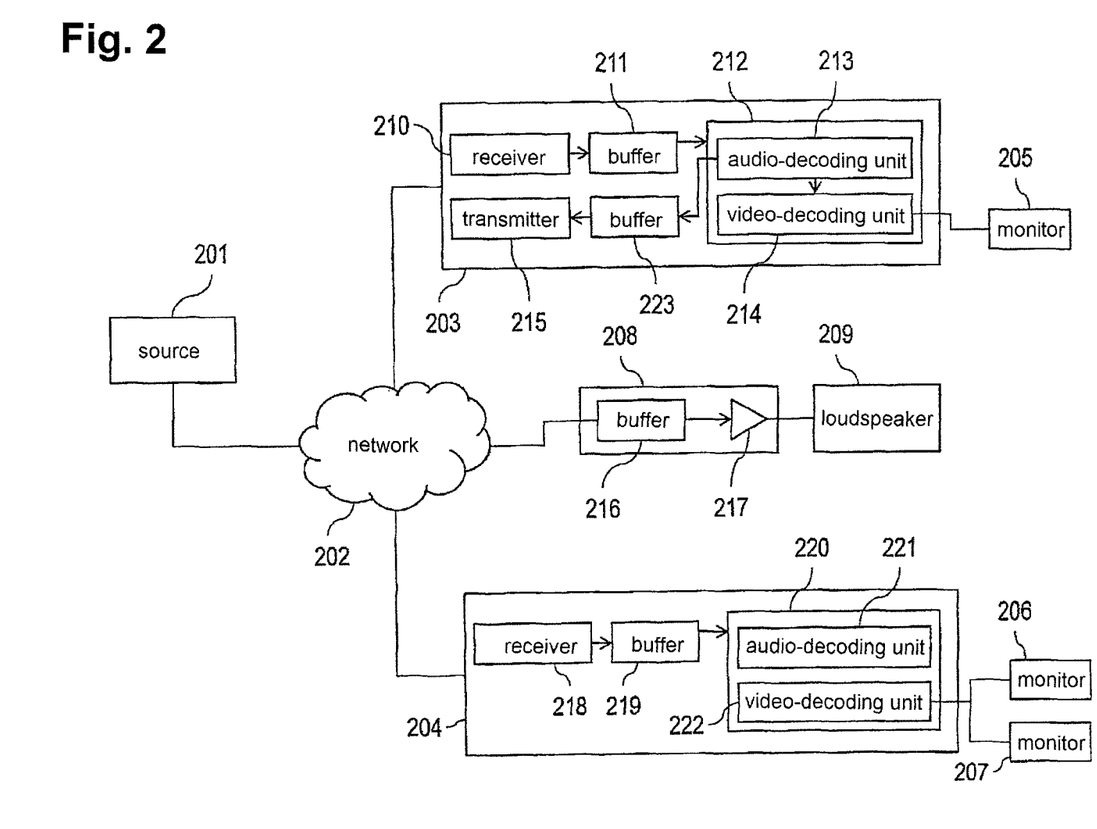
FIG. 2 is a view of a block diagram of several components of a vehicle which are mutually connected by means of a network.

FIG. 2 illustrates a block diagram of several components of a vehicle which are connected with one another by means of a network.

A source 201 provides audio-visual data in the form of a compressed data stream comprising pieces of video and audio information by way of a network 202, for example, an Ethernet, a processing unit 203 (such as a head unit) and a processing unit 204 (such as an RSE unit). One monitor 205 is connected to the processing unit 203, and two monitors 206 and 207 are connected to the processing unit 204.

Furthermore, an amplifier 208 is illustrated that is connected with the network 202. A loudspeaker 209 is connected to the amplifier 208. Correspondingly, several amplifiers or several loudspeakers (among others, per amplifier) may be provided.

The processing unit 203 comprises a receiver 210, which is connected by way of a buffer 211 with a demultiplexer/decoder 212. The demultiplexer/decoder 212 comprises an audio-decoding unit 213 and a video-decoding unit 214, the audio-decoding unit 213 being implemented, for example, in software, and the video-decoding unit 214 being implemented, for example, in hardware. The monitor 205 is controlled by way of the video-decoding unit 214, i.e., the piece of decoded video information can be outputted on the monitor. Furthermore, the processing unit 203 comprises a transmitter 215, which transmits the piece of decoded audio information contained in a buffer 223 from the audio-decoding unit 213 by way of the network to the amplifier 208.

The amplifier 208 preferably comprises a buffer 216 for temporarily storing received audio information and a driver 217 which controls the (at least one) loudspeaker 209.

The construction of the processing unit 204 corresponds largely to that of the processing unit 203, with the exception that, in the example according to FIG. 2, the processing unit 204 has no transmitter, and, for example, outputs the piece of decoded video information on the two monitors 206 and 207. The processing unit 204 therefore comprises a receiver 218 that is connected with a demultiplexer/decoder 220 by way of a buffer 219. The demultiplexer/decoder 220 comprises an audio-decoding unit 221 and a video decoder unit 222, the audio-decoding unit 221 being implemented, for example, in software and the video-decoding unit 222 being implemented, for example, in hardware.

The processing unit 203, processing unit 204, amplifier 208 and source 201 components connected with the network are time-synchronized by means of a protocol (for example, IEEE802.1AS or PTPv2) and therefore have a common synchronous time base.

Figure 3:
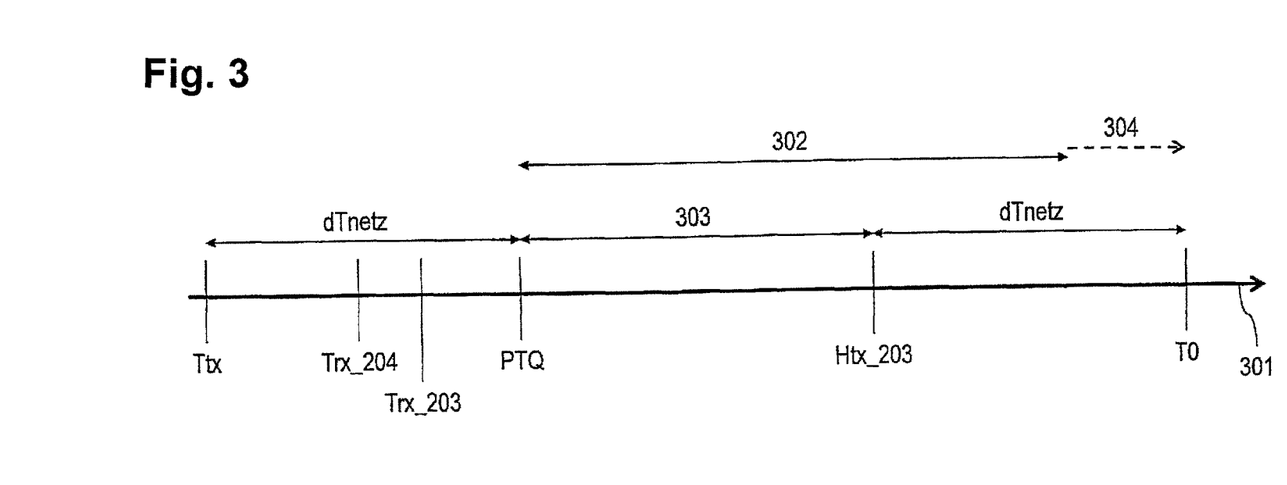
FIG. 3 is a schematic view of a timeline with different points in time for illustrating a lip-synchronized output of a piece of audio information by way of a main sound field.

FIG. 3 schematically shows a timeline 301 with different points in time and illustrates how a lip-synchronized output of the piece of audio information can be achieved by way of a main sound field.

At a time T0, pieces of video information and audio information are to be outputted in a lip-synchronous manner. At a time Ttx, the source 201 sends out the data stream comprising the compressed piece of video information with the compressed piece of audio information. The data stream arrives at the processing unit 203 at a point in time Trx_203 and at the processing unit 204 at a point in time Trx_204. Particularly as a result of the transit times in the network 202, the points in time Trx_203 and Trx_204 will differ.

The audio-decoding unit 213 of the processing unit 203 processes the data faster than the video-decoding unit 214; i.e. the audio information is available earlier than the pertaining video information. Optionally, a buffer 223 (temporary memory) of the decoded pieces of audio and/or video information may be provided in the processing unit 203. The audio-decoding unit 213 can optionally delay ("slow down") the processing of the data (decoding of the piece of video information) at the video-decoding unit 214, when the decoding of the audio contents is delayed because, for example, the processing unit 203 temporarily has to carry out other tasks (software processes of a higher priority). This delay (controlling of the video-decoding unit 214) is outlined in FIG. 2 by an arrow from the audio-decoding unit 213 to the video-decoding unit 214.

The processing unit 204 decodes the piece of audio information and the piece of video information by means of the demultiplier/decoder unit 220. The decoded piece of audio information is discarded; the decoded piece of video information is outputted on the monitors 206, 207. Preferably, the decoded piece of video information is outputted almost without delay in order to require no (additional or large) buffer for temporarily storing the decoded piece of video information in the processing unit 204.

In order to achieve a lip-synchronized output of the piece of audio information with respect to the piece of video information shown on the monitors 205, 206, 207, the common time base of the components connected to the network in connection with the presentation time of the IEEE 1722 transport protocol is used as follows: The source 201 writes into a IEEE 1722 packet a presentation time PTQ which is so far in the future that the data stream from the source 201 can reach the processing unit 203 as well as the processing unit 204:

$$PTQ = Ttx + dT\text{network},$$

wherein dTnetwork indicates this maximally assumed transmission delay (time delay caused by the transfer by way of the network 202). The processing units 203 and 204 store the packets in their buffers 211, 219 and forward the stored packets not before the point in time PTQ to the demultiplexer/decoder 212, 220.

It is thereby ensured that the demultiplexers/decoders 212, 220 start with the processing or decoding of the same data packet at the same time.

In order to achieve the lip-synchronized output of the piece of audio information, it is provided that the audio-decoding unit 213 of the processing unit 203 can influence or control, particularly delay ("slow down"), the video-decoding unit 222 of the processing unit 204. For this purpose, the audio-decoding unit 213 sends a message (such as a telegram) to the processing unit 204 comprising the output time T0, for example, comprising a PTP time stamp with this output time T0. At the output time T0, the piece of audio information is to be reproduced; the processing unit 204 can correspondingly adapt the output of the piece of video information on the monitors 206, 207. The audio-decoding unit 213 can thereby control (for example, slow down) the video-decoding unit 214 and, by way of the above-mentioned telegram, which is transmitted by way of the transmitter 215 to the processing unit 204, or the video-decoding unit 222, also the video decoding unit 222. It is thereby ensured that the output of the piece of video information on the monitors 205, 206 and 207 takes place essentially in a time-synchronized and synchronous manner with respect to the piece of audio information.

Thus, the processing unit 203 transmits at a time Htx_203 the decompressed piece of audio information to the amplifier 208 by means of an IEEE 1722 packet comprising the above-mentioned presentation time T0, wherein the following applies:

$$T0 = Htx\_203 + dT\text{network}.$$

This correspondingly leads to the requirement for the network 202 that the transmission delay dTnetwork should be so brief that it can be reached by the slowing-down of the video-decoding unit 222 with respect to the time duration 303 needed (by the audio decoding unit 213) for the decoding of the piece of audio information. In order words, a processing time 302 of the video decoding unit 222 is to be modified such that the sum can be reached from the time duration 303 and the transmission delay dTnetwork. Since the delay 304 of the processing time 302 of the video-decoding unit is possible only to a limited extent without additional temporary storage of the decoded piece of video information, the network should then provide a correspondingly fast transmission and thereby a correspondingly brief transmission delay dTnetwork.

In particular, the video-decoding unit may have a buffer, so that a holding function and a skipping function of data temporarily stored in the buffer can take place in order to correspondingly influence the output.

However, this requirement is eliminated when a buffer is provided at the output of the video-decoding unit 222, and correspondingly a buffer is provided at the output of the video-decoding unit 214 (not shown in FIG. 2).

In this case, it is an advantage that an Ethernet can be used as the network 202 in the vehicle, and nevertheless, a lip-synchronized output of a piece of audio information and of video information, which are decoded at different locations in the vehicle, can take place. It is a further advantage that no additional expensive buffers or memories are required in the processing units or decoding units.

Figure 4:
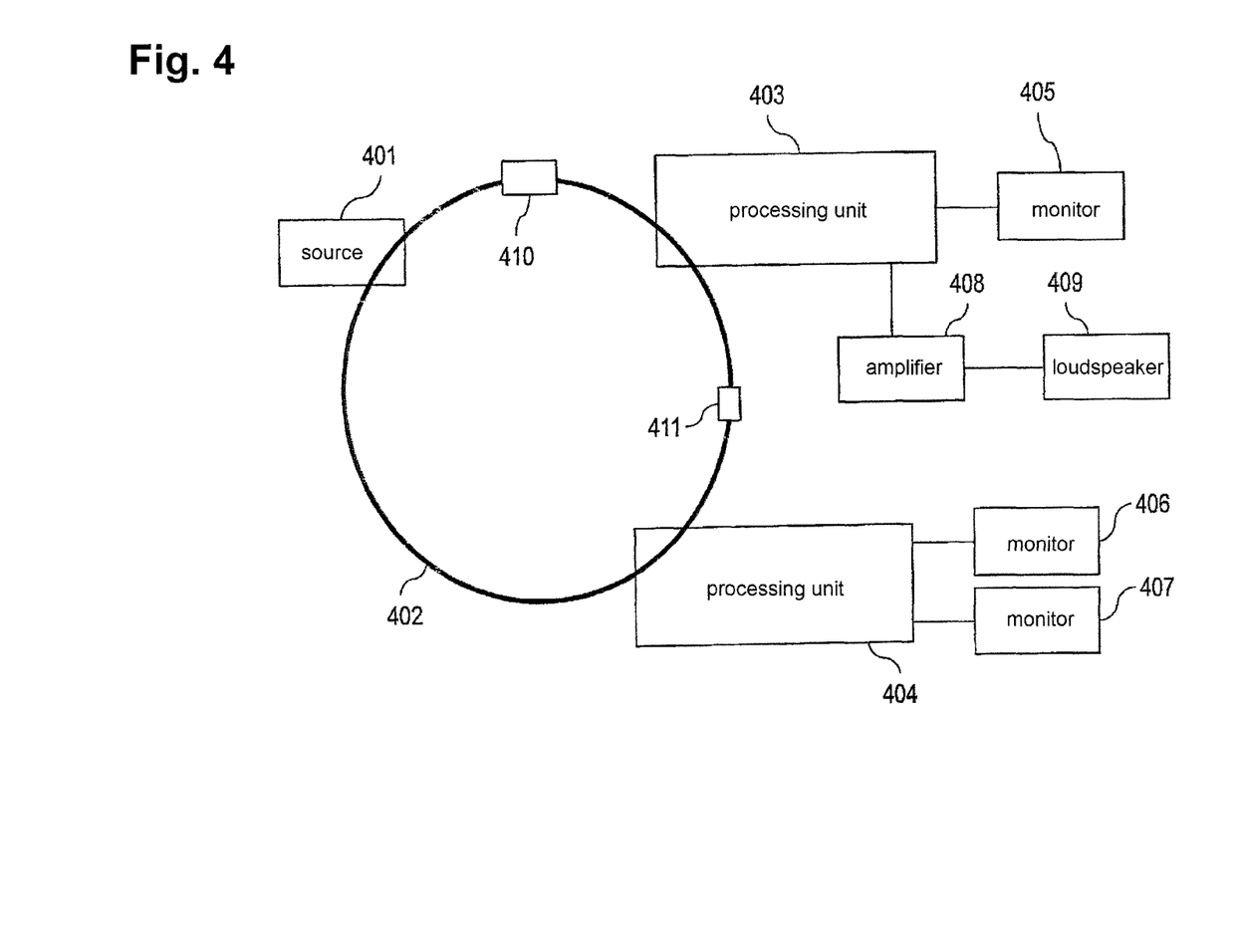
FIG. 4 is a view of a block diagram of several components of a vehicle which are connected with one another by way of a bus system.

FIG. 4 illustrates an alternative embodiment with a block diagram of several components of a vehicle, which are mutually connected by way of a bus system.

A data source 401 is connected by way of a bus system 402, such as a MOST bus, with a first processing unit 403 (such as a head unit) and with a second processing unit 404 (such as an RSE unit). A monitor 405 as well as an amplifier 408 are connected to the first processing unit 403, which amplifier 408 feeds at least one loudspeaker 409. Furthermore, two monitors 406, 407 are connected to the second processing unit 404.

A compressed audio-visual data stream 410 (such as a DMB video) is sent from the data source 401 by way of a synchronous and/or isochronous channel of the bus system 402 to the two processing units 403, 404 (video sinks).

The audio-visual data stream 410 preferably has time stamp information by means of which a playback point in time can be determined in the processing units 403, 404 (the data source 401 MPEG-TS, for example, transmits data packets).

The audio-visual data stream 410 is decoded in the processing unit 404; the decoded piece of audio information is discarded, and the decoded piece of video information is outputted to the connected monitors 406, 407.

The audio-visual data stream 410 is correspondingly decoded in the processing unit 403; the decoded piece of audio information is (for example, in an unbuffered condition) transmitted by way of the bus system 402 on a synchronous and/or isochronous channel to the amplifier. As an alternative, it is conceivable that the amplifier 408 is controlled directly by the processing unit 403. The video contents decoded by the processing unit 403 are outputted (in a timely, particularly immediate manner), preferably only a small buffer or memory being provided for the decoding and output of the video data (for example, in a video-decoding unit implemented as hardware).

In order to prevent that the processing units 403 and 404 drift apart as a result of transit time differences, and therefore a lip-synchronized output of the piece of audio information and the piece of video information is no longer ensured, the following synchronization mechanism is suggested: The processing unit 403, which controls the main sound field of the vehicle by means of the decoded piece of audio information, sends a piece of synchronization information 411, particularly a time stamp (for example, a decoding time stamp in system ticks) to the processing unit 404.

The piece of synchronization information is preferably transmitted by way of a synchronous and/or isochronous channel of the bus system.

Figure 5:
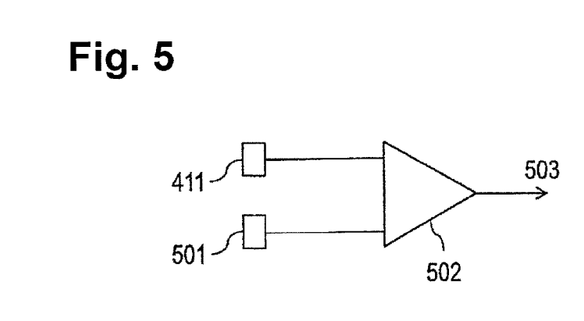
FIG. 5 is a schematic view of a block diagram for illustrating a synchronization between decoding units connected to the bus system according to FIG. 4.

FIG. 5 schematically shows a block diagram for analyzing and adjusting the piece of synchronization information 411 in the processing unit 404. Thus, by means of a comparator 502, the piece of synchronization information 411 is compared with a time stamp 501 of the processing unit 404, and, by means of the determined deviation 503, the processing unit is 404 synchronized (up), i.e. adjusted correspondingly. It is thereby achieved that the processing units 403, 404 are synchronous with respect to one another. The synchronization of the processing unit 404 can, for example, be achieved in that individual frames are skipped or are outputted twice.

LIST OF REFERENCE SYMBOLS

101 Source
102 Network
103 Processing unit
104 Processing unit
105 Monitor
106 Monitor
107 Monitor
108 Amplifier
109 Loudspeaker
201 Source
202 Network
203 Processing unit
204 Processing unit
205 Monitor
206 Monitor
207 Monitor
208 Amplifier
209 Loudspeaker
210 Receiver
211 Buffer (memory)
212 Demultiplexer/decoder
213 Audio-decoding unit
214 Video-decoding unit
215 Transmitter
216 Buffer (memory)
217 Driver
218 Receiver
219 Buffer (memory)
220 Demultiplexer/decoder
221 Audi-decoding unit
222 Video-decoding unit
223 Buffer (memory)
301 Timeline
302 Processing time of video-decoding unit 222
303 Processing time of audio-decoding unit 213
304 Delay
T0 Output time
PTQ Presentation time (predefined by the source 201)
Ttx Time at which the source sends out the data (packets)
dTnetz Transmission delay in the network 202
Trx_203 Point in time at which the data are received by the processing unit 203
TRx_204 Point in time at which the data are received by the processing unit 204
Htx_203 Point in time at which the processing unit 203 transmits the decompressed piece of audio information to the amplifier 208 by means of an IEEE 1722 packet 401 Source
402 Network (bus system)
403 Processing unit
404 Processing unit
405 Monitor
406 Monitor
407 Monitor
408 Amplifier
409 Loudspeaker
410 A/V data stream
411 Piece of synchronization information
501 Time stamp
502 Comparator
503 Deviation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing data in a vehicle,
   receiving the data at a first processing unit and a second processing unit via a network communicatively coupling the first and second processing units to a data source,
   decoding the received data via the first processing unit,
   transmitting an output time from the first processing unit to the second processing unit;
   decoding the received data via the second processing unit, wherein a portion of the decoded data, including audio or video information, is discarded,
   outputting un-discarded decoded data according to the output time, wherein said outputting includes:
     controlling an output of a video-decoding unit of the second processing unit according to the output time, and
     controlling an output of a video-decoding unit of the first processing unit to be delayed in accordance with an audio-decoding unit of the first processing unit.

2. A method for processing source data in a vehicle having first and second processing units for respectively controlling first and second audio and/or visual output devices based on the source data, the method comprising:
   receiving the source data by the first processing unit including audio and video decoding units, wherein the source data is transmitted from a data source to the first processing unit via a network communicatively coupling the data source to the first processing unit;
   decoding the source data via the audio and video decoding units of the first processing unit;
   transmitting reproduction information, including an output time data, of the source data to the second processing unit; and
   operating the second output device in synchronization with the first output device based on the reproduction information,
   wherein the second processing unit has an audio-decoding unit and a video-decoding unit, an output of the video-decoding unit being controlled by way of the output time data.

3. The method according to claim 2, further comprising:
   receiving the source data by the second processing unit, wherein the source data is transmitted from the data source to the second processing unit via the network communicatively coupling the data source to the second processing unit.

4. The method according to claim 3, further comprising:
   decoding the source data via the second processing unit,
   discarding a portion of the data decoded by the second processing unit; and
   operating the second output device based on the non-discarded portion of the decoded data and according to the output time data.

5. The method according to claim 4, wherein the output time data indicates a presentation time as of which the received data are anticipated to be decoded by the first processing unit and by the second processing unit.

6. The method according to claim 5, wherein the source data comprise data packets, at least one data packet containing a presentation time.

7. The method according to claim 4, wherein the second processing unit has an audio-decoding unit and a video-decoding unit, an output of the video-decoding unit being controlled by way of the output time data.

8. The method according to claim 7,
   wherein an output of the video-decoding unit of the first processing unit is controlled in accordance with the audio-decoding unit of the first processing unit.

9. The method according to claim 4, wherein the first processing unit has an audio-decoding unit and a video-decoding unit, an output of the video-decoding unit being controlled by the audio-decoding unit of the first processing unit.

10. The method according to claim 2, wherein the first processing unit has an audio-decoding unit and a video-decoding unit, an output of the video-decoding unit being controlled the audio-decoding unit.

11. The method according to claim 10, wherein the video-decoding unit of the first processing unit is controlled by means of the output time data.

12. The method according to one of claim 2, wherein the first output unit comprises at least one amplifier associated with at least one loudspeaker.

13. The method according to one of claim 12, wherein the portion of the source data transmitted are transmitted to the first output unit with the output time data.

14. The method according to claim 13, wherein the portion of the source data transmitted are transmitted to the output unit by means of an AVB protocol, including at least one IEEE 1722 data packet.

15. The method according to claim 2, wherein the network comprises a bus system.

16. A method for processing source data in a vehicle having first and second processing units for respectively controlling first and second audio and/or visual output units based on the source data, the method comprising:
   receiving the source data by the first processing unit including audio and video decoding units, wherein the source data is transmitted from a data source to the first processing unit via a network communicatively coupling the data source to the first processing unit;
   decoding the source data via the audio and video decoding units of the first processing unit;
   transmitting reproduction information, including an output time data, of the source data to the second processing unit; and
   operating the second output device in synchronization with the first output unit based on the reproduction information, wherein a portion of the source data decoded by the first processing unit is transmitted to the first output unit via the network, and wherein the portion of the data transmitted to the first output unit comprises audio data.

* * * * *